Patented Jan. 13, 1942

2,269,792

UNITED STATES PATENT OFFICE 2,269,792

1-METHYLBUTYL-P-AMINOBENZOATE

Horace A. Shonle and Wilbur J. Doran, Indianapolis, Ind., assignors to Eli Lilly and Company, Indianapolis, Ind., a corporation of Indiana No Drawing. Application August 19, 1940,
Serial No. 353,249

1 Claim. (Cl. 260—471)

This invention relates to 1-methylbutyl-p-aminobenzoate.

Local anesthetics which are administered in the form of oils and ointments are especially useful in the treatment of burns, dermatosis, and in the installation of instruments incident to the examination of the bladder and trachea. The anesthetic employed for this purpose must be oil soluble and must not produce irritation of the delicate membranes and other parts of the body with which it contacts. In general, the period of insensibility produced by an oil-soluble anesthetic per unit weight is a direct index of its effectiveness as an anesthetic. When employed for locally desensitizing an area of the body for the installation of instruments in an examination, the anesthetic to be effective must cause insensibility for the period of the examination. The greater number of oil-soluble anesthetics heretofore employed which do not cause irritation, do not produce insensibility for a sufficiently long period to be satisfactory for certain therapeutic applications.

In accordance with this invention, 1-methylbutyl-p-aminobenzoate is employed for producing anesthesia. The 1-methylbutyl-p-aminobenzoate possesses a longer period of anesthesia without causing irritation than any other oil-soluble local anesthetic investigated. It is particularly useful in the preparation of local anesthetic oils and ointments.

The method of preparing the 1-methylbutyl-p-aminobenzoate is as follows:

To 186 g. (1 mol) of p-nitrobenzoyl chloride is added a mixture of 90 g. (1.02 mols) of 2-pentanol and 80 g. (1.01 mols) of pyridine with stirring and cooling during the addition. After the addition is completed, the mixture is heated for one half hour at a temperature between 80° and 100° C. The intermediate product, 1-methyl-butyl-p-nitrobenzoate, is formed in this reaction.

The reaction which takes place may be represented by the following equation:

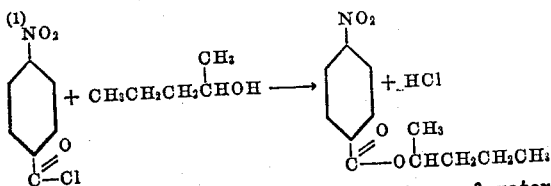

To the reaction mixture about 200 cc. of water are added, then about 200 cc. of ether are added to dissolve the 1-methylbutyl-p-nitrobenzoate. The mixture is well agitated and then permitted to stand. It separates into two layers. The water layer is discarded, while the ether layer is washed twice with approximately 100 cc. portions of 0.5N hydrochloric acid. The ether layer is then washed twice with about 100 cc. portions of 1 N sodium hydroxide solution. The ether layer is dried by any suitable means, such as dried sodium sulfate, filtered, and the ether in the ether layer removed by vacuum distillation. The residue, which is the 1-methylbutyl-p-nitrobenzoate, is an oil at room temperatures.

The 1-methylbutyl-p-nitrobenzoate is mixed with about 250 g. of iron filings. About 140 cc. of water are added to the mixture. About 40 cc. of glacial acetic acid are then added and the mixture agitated on a steam bath for a period of about five hours. The 1-methylbutyl-p-aminobenzoate is formed during this reaction.

The reaction which takes place may be represented by the following equation:

(2) 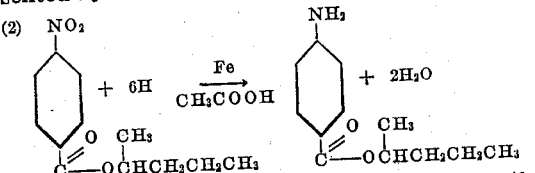

Approximately 200 cc. of ether are added, the mixture is well agitated and then permitted to stand. The ether layer, which contains the 1-methylbutyl-p-aminobenzoate, is decanted off and the ether removed therefrom by means of vacuum distillation. To purify the 1-methylbutyl-p-aminobenzoate, the hydrochloride or other salt of this compound is preferably formed and subsequently the methylbutyl-p-aminobenzoate is obtained from the salt if the parent compound is desired. A salt, such as the hydrochloride, is produced by dissolving the residue containing the 1-methylbutyl-p-aminobenzoate in about 300 cc. of anhydrous ether and saturating the ether solution with dry hydrogen chloride. The 1-methylbutyl-p-aminobenzoate hydrochloride which is formed during the passage of hydrogen chloride through the ether solution separates out, is filtered and washed with anhydrous ether. The 1-methylbutyl-p-aminobenzoate hydrochloride is dissolved in about 1000 cc. of water. About 400 cc. of 10% sodium hydroxide are added to the water solution to neutralize the hydrochloric acid present. The 1-methylbutyl-p-aminobenzoate is extracted with 300 cc. of ether and the ether is evaporated by vacuum distillation. The residue, which is the 1-methylbutyl-p-aminobenzoate, is an oil which boils at about 169° to 170° C., uncorrected, at 4 mm. pressure and may be represented by the following formula:

(3)
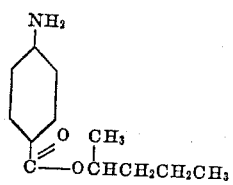

The 1-methylbutyl-p-nitrobenzoate may be reduced to 1-methylbutyl-p-aminobenzoate by other suitable reduction methods, such as catalytic hydrogenation or ammonium sulfide.

The 1-methylbutyl-p-aminobenzoate may be dissolved in oils or ointments for use as local anesthetics. Among the oils which may be employed for this purpose is an oil selected from the class which consists of vegetable oils, such as cottonseed oil, peanut oil, sesame oil, or olive oil, or a lower-alkyl ester of a fatty acid, the alkyl group having not more than six carbon atoms, such as ethyl oleate or the ethyl or n-propyl esters of the fatty acids of cocoanut oil, olive oil, peanut oil, or sesame oil. For example, a solution of 1-methylbutyl-p-aminobenzoate is prepared by dissolving 0.5 g. of 1-methylbutyl-p-aminobenzoate in 100 cc. of peanut oil or ethyl oleate. The solution is an effective local anesthetic for topical applications.

What is claimed is:

1-methylbutyl-p-aminobenzoate.

HORACE A. SHONLE.
WILBUR J. DORAN.